(12) United States Patent
Völkl

(10) Patent No.: US 9,668,493 B2
(45) Date of Patent: Jun. 6, 2017

(54) SHASHLYK MACHINE AND METHOD FOR MAKING SHASHLYKS

(71) Applicant: Anton & Völkl Patente UG (haftungsbeschränkt) & Co. KG, Irschenberg (DE)

(72) Inventor: Thomas Völkl, Bruckmühl (DE)

(73) Assignee: TVI Entwicklung und Produktion GmbH, Irschenberg (DE)

( * ) Notice: Subject to any disclaimer, the term of this patent is extended or adjusted under 35 U.S.C. 154(b) by 46 days.

(21) Appl. No.: 14/677,652

(22) Filed: Apr. 2, 2015

(65) Prior Publication Data

US 2015/0282495 A1   Oct. 8, 2015

(30) Foreign Application Priority Data

Apr. 3, 2014  (DE) .................. 10 2014 104 749

(51) Int. Cl.
*A22C 17/00*   (2006.01)
*A23N 15/00*   (2006.01)

(52) U.S. Cl.
CPC ........ *A22C 17/0066* (2013.01); *A22C 17/006* (2013.01); *A23N 15/00* (2013.01); *Y10T 83/141* (2015.04); *Y10T 83/222* (2015.04)

(58) Field of Classification Search
CPC .......................... A22C 17/006; A22C 17/0066
USPC ............................. 219/419, 420; 99/419, 420
See application file for complete search history.

(56) References Cited

U.S. PATENT DOCUMENTS

| 3,338,156 A | * | 8/1967 | Angelos | A47J 37/044 99/420 |
| 4,440,071 A | * | 4/1984 | Boosalis | A47J 37/045 221/150 A |
| 4,604,771 A | * | 8/1986 | Dolle | A22C 17/006 227/139 |
| 4,837,895 A | * | 6/1989 | Emsens | A22C 17/006 452/174 |
| 4,842,181 A | * | 6/1989 | Walser | A22C 17/006 227/101 |
| 4,893,553 A | * | 1/1990 | Emsens | A22C 17/006 100/94 |
| 5,127,319 A | * | 7/1992 | Dolle | A22C 17/006 99/419 |

(Continued)

FOREIGN PATENT DOCUMENTS

| DE | 602004001588 | 8/2007 | |
| DE | 102008009693 A1 | * 9/2008 | ......... A22C 17/0066 |

(Continued)

*Primary Examiner* — David Angwin
*Assistant Examiner* — Lawrence Samuels
(74) *Attorney, Agent, or Firm* — Head, Johnson, Kachigian & Wilkinson, PC

(57) ABSTRACT

In order to produce shish kebab skewers (100) in a substantially automated manner, the individual ingredients (98) are individually provided in cups (6) of a cup arrangement (7) including sequential cup rows (8a, b) and cup lines (12a, b) so that a skewer holder (3) in which plural skewers (99) are received in a row adjacent to one another respectively prongs the same ingredient (98) onto all its skewers (99) simultaneously in that it lowers relative to the cups in whose bases (17) pass through openings (32) are arranged so that the ingredients (98) in the cups (6) are pronged onto the skewers (99).

14 Claims, 15 Drawing Sheets

(56) References Cited

U.S. PATENT DOCUMENTS

Figure 1A:
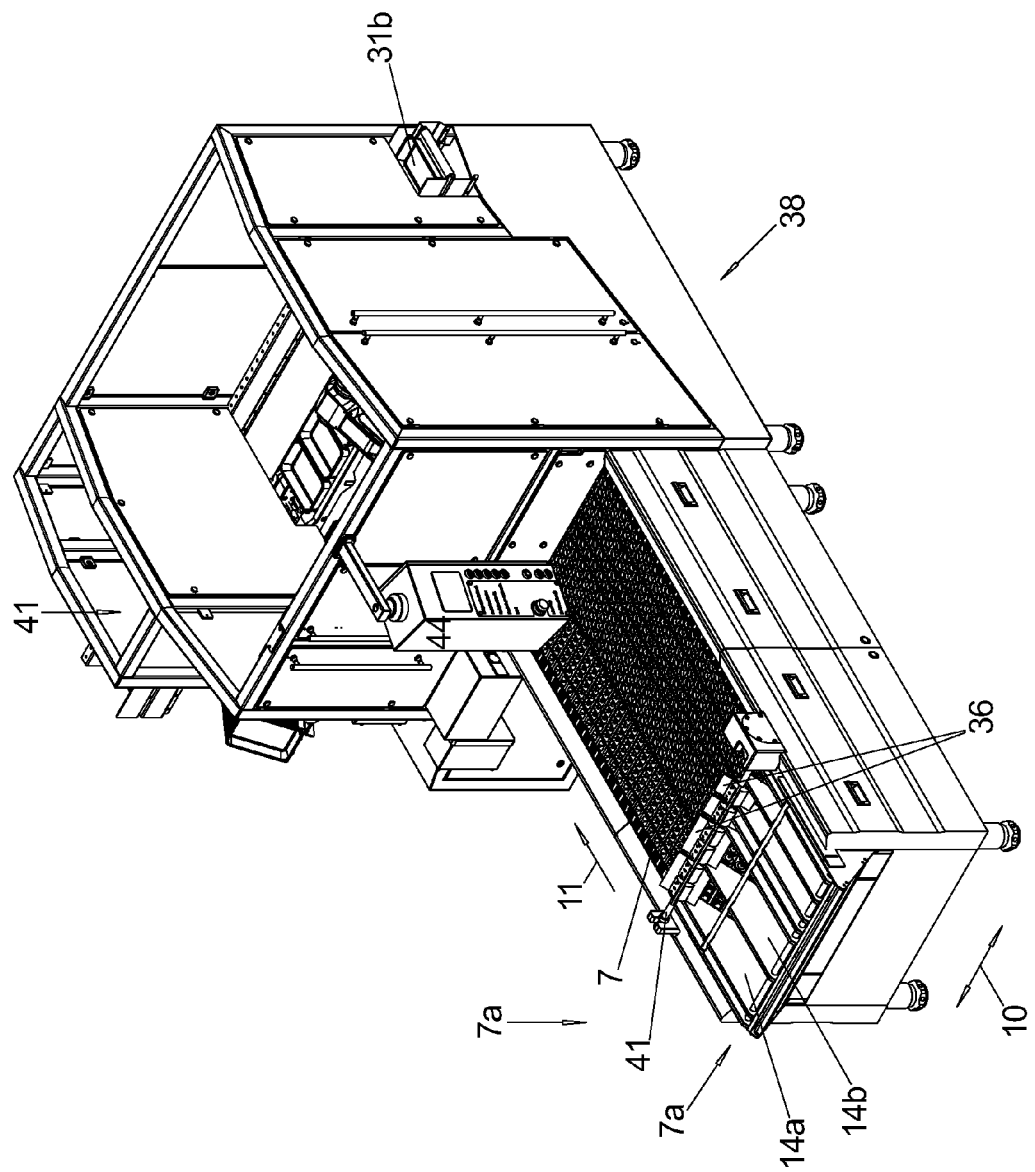

| | | | | |
|---|---|---|---|---|
| 5,740,722 A * | 4/1998 | Emsens | ................ | A22C 17/006 |
| | | | | 99/419 |
| 5,876,764 A * | 3/1999 | Buttin | ................... | A23G 7/0031 |
| | | | | 221/186 |
| 6,161,471 A * | 12/2000 | Emsens | ................ | A22C 17/006 |
| | | | | 99/419 |
| 7,476,150 B2 * | 1/2009 | Ilch | ...................... | A22C 17/006 |
| | | | | 452/198 |
| 7,934,448 B2 * | 5/2011 | Walser | ............... | A22C 17/0066 |
| | | | | 227/39 |
| 8,025,008 B2 * | 9/2011 | Walser | ................. | A22C 17/006 |
| | | | | 425/126.2 |
| 2004/0194639 A1 * | 10/2004 | Ilch | ..................... | A22C 17/006 |
| | | | | 99/450.6 |
| 2007/0275648 A1 * | 11/2007 | Sato | .................... | A22B 5/0041 |
| | | | | 452/157 |
| 2009/0181155 A1 * | 7/2009 | Walser | ................. | A22C 17/006 |
| | | | | 426/665 |
| 2012/0279371 A1 * | 11/2012 | Mulchi, Jr. | .......... | A22C 17/002 |
| | | | | 83/821 |

FOREIGN PATENT DOCUMENTS

| | | | | |
|---|---|---|---|---|
| DE | 202011050589 | | 10/2011 | |
| JP | WO 2009025082 A1 * | | 2/2009 | ........... A22C 17/006 |
| JP | 2009044998 | | 3/2009 | |
| WO | WO2013153565 | | 10/2013 | |

* cited by examiner

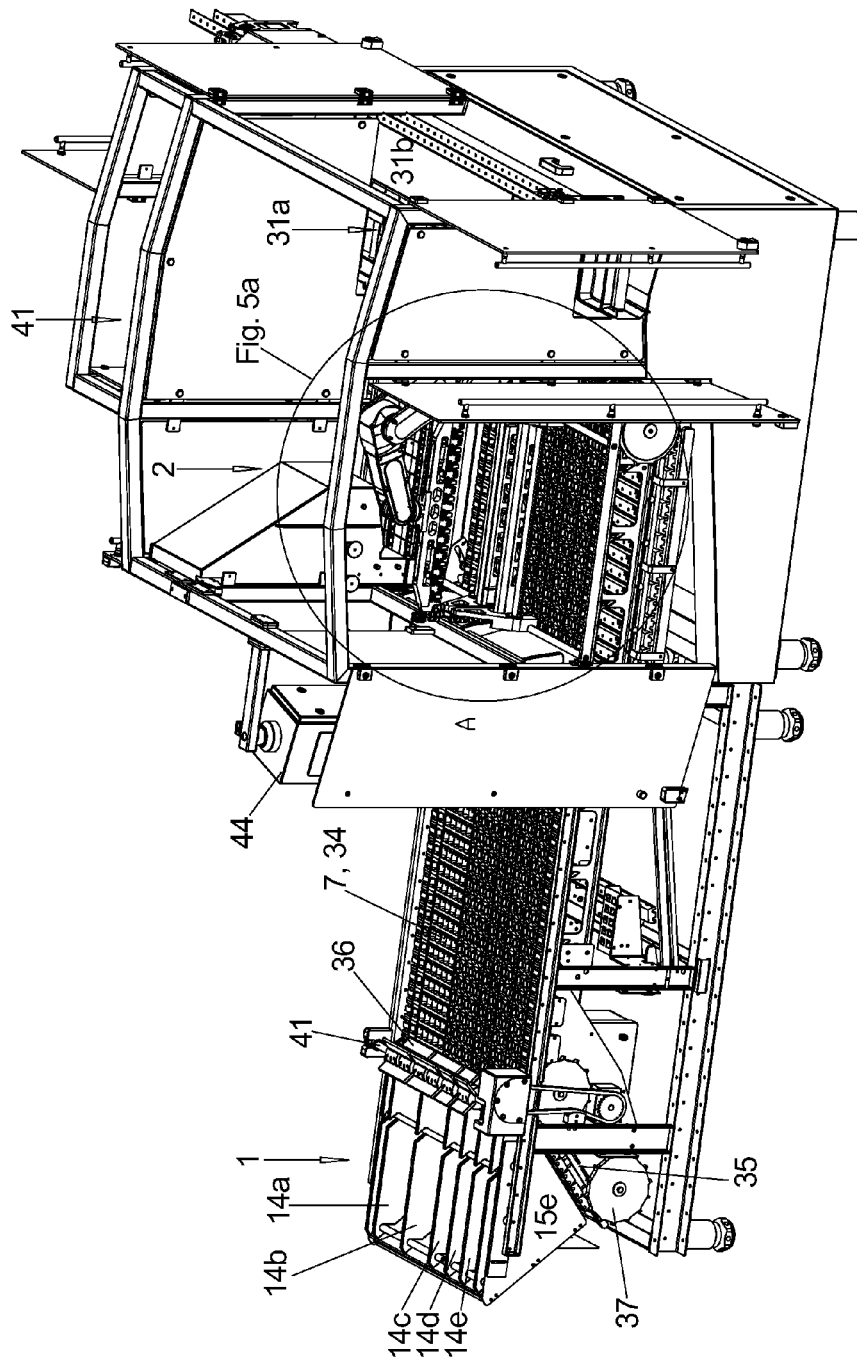

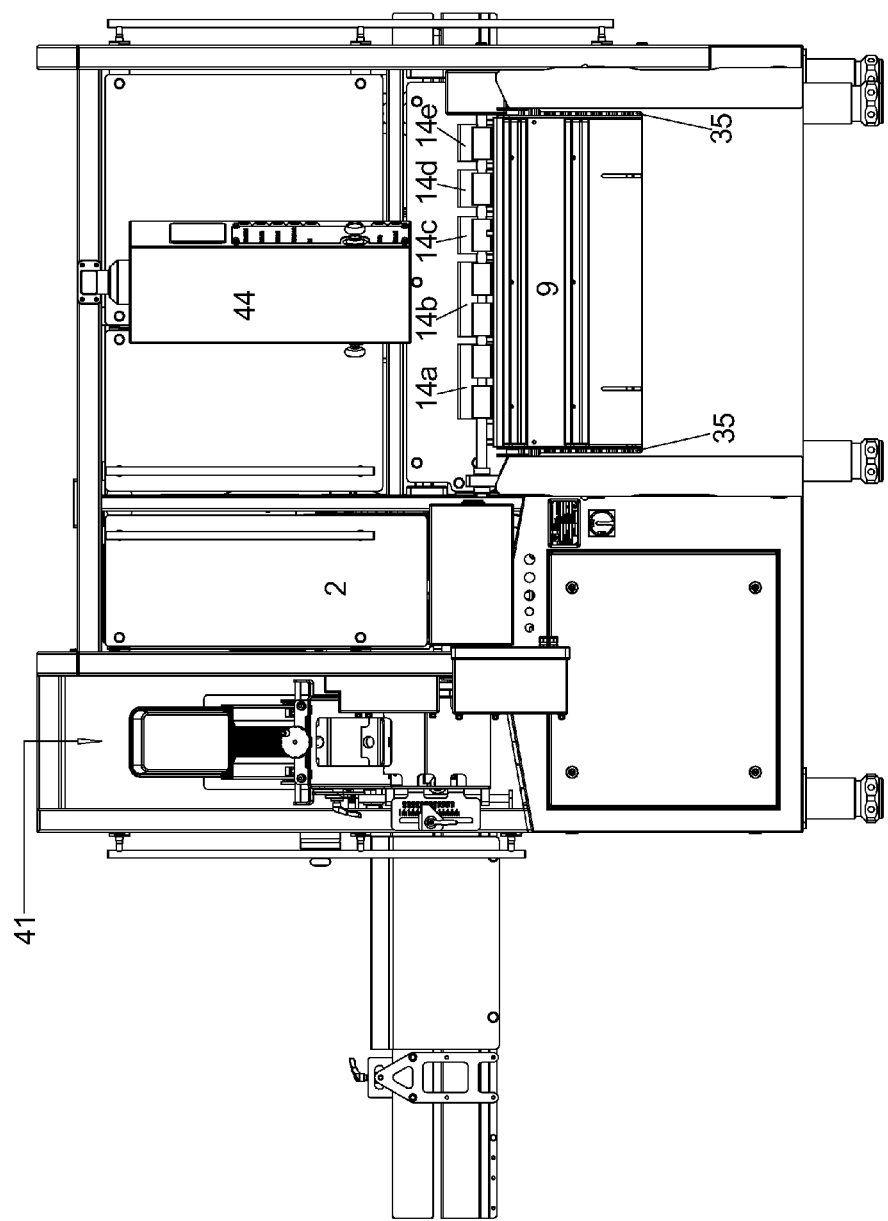

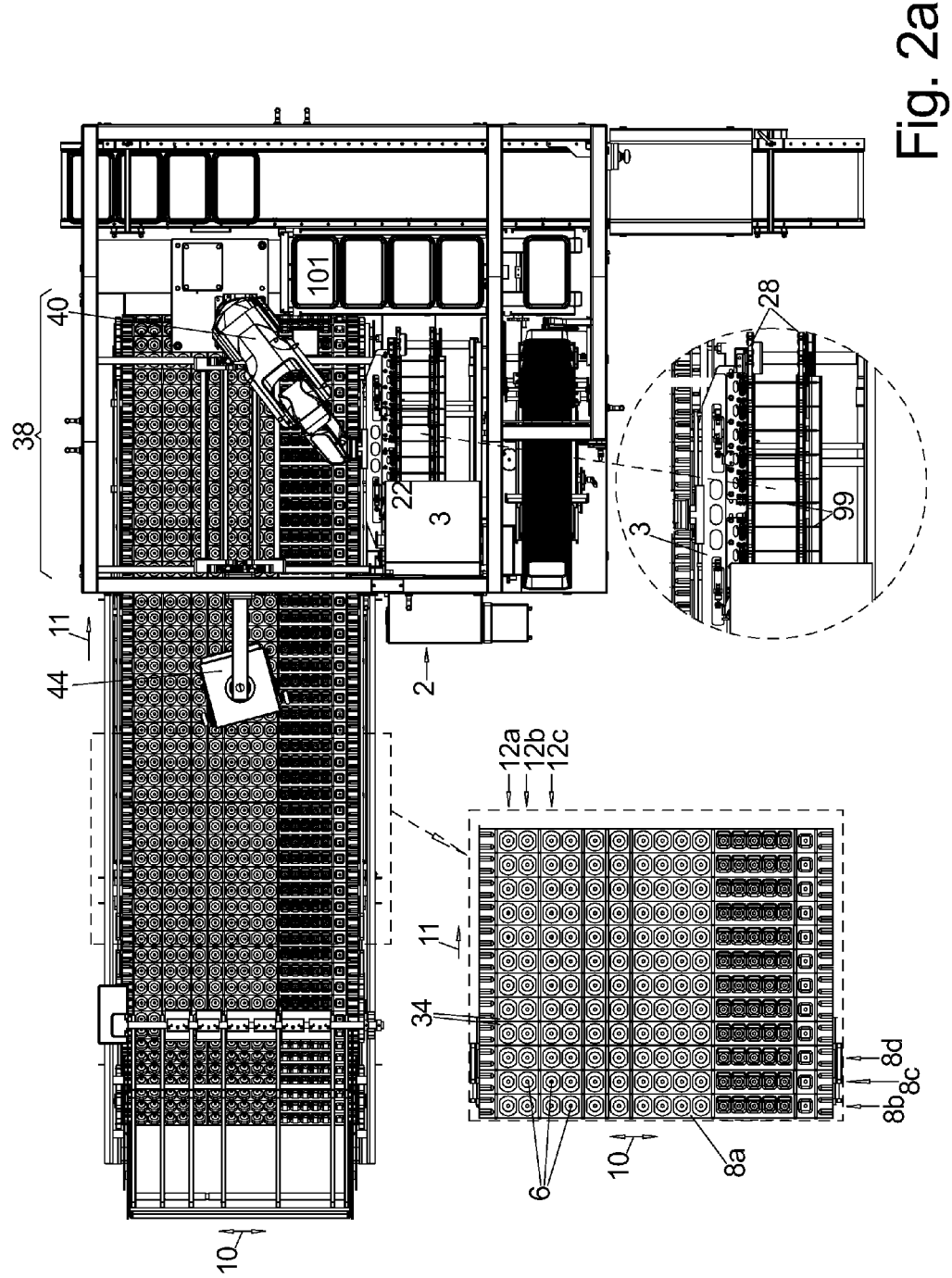

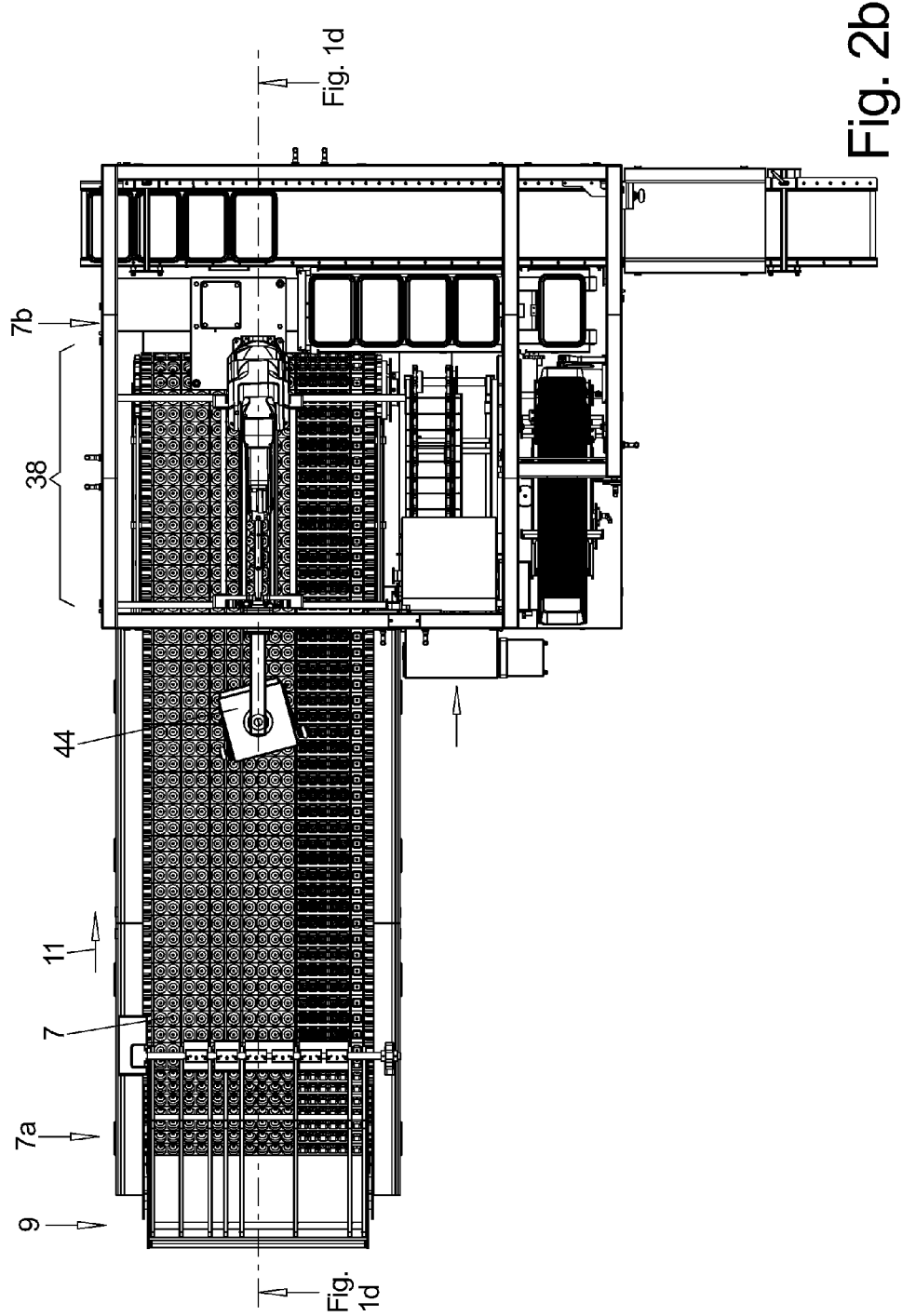

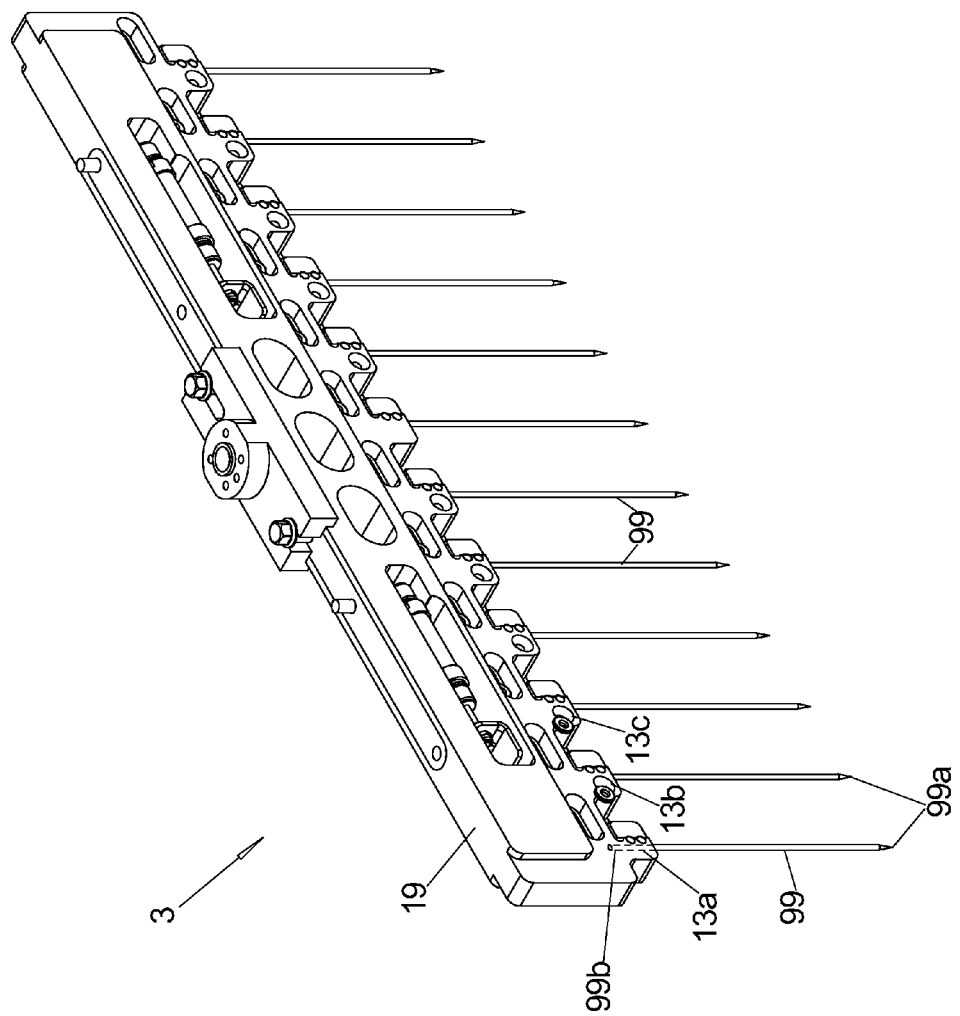

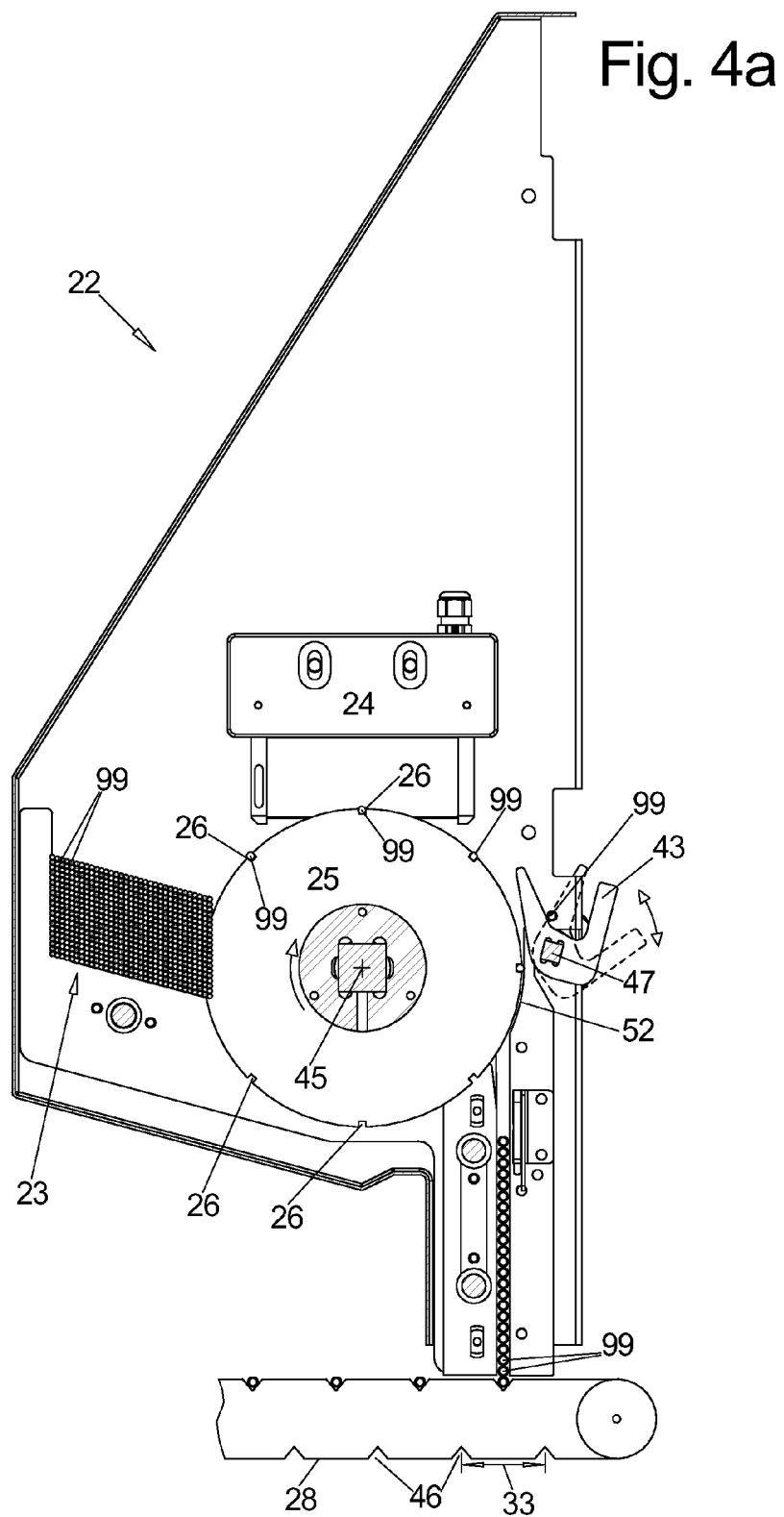

SHASHLYK MACHINE AND METHOD FOR MAKING SHASHLYKS

I. FIELD OF THE INVENTION

The invention relates to producing shish kebab skewers where ingredients in the form of pieces of meat or pieces of vegetables like e.g. pieces of paprika and onion are sequentially placed on skewer, typically a disposable skewer made of wood, advantageously in a predetermined sequence.

A standard shish kebab skewer is made from 5 pieces of met today and 4 paprika and onion pieces which shall be provided on the skewer in a predetermined sequence.

II. BACKGROUND OF THE INVENTION

Due to the following problems pronging on the skewer has been typically performed by hand so far:
the individual ingredients differ in shape and size
the individual ingredients differ in hardness and toughness
the skewers are not always straight
the skewers are instable in transversal direction Even a partial automation of the production process has only taken place in as far as pronging the individual ingredients along a conveyor belt was distributed between different manual laborers so that each laborer prongs a particular ingredient in a particular position in the sequence of the ingredients on to the skewer.

Besides that solutions are known in which a robot supports a skewer and prongs the ingredients one after another that are provided on a conveyor belt out of sequence, and/or the ingredients are conveyed in channels and pronged by hand.

However the complexity is much too high in relation to the output actually achieved.

III. DETAILED DESCRIPTION OF THE INVENTION a) Technical Task

Thus, it is an object of the invention to provide a method and a device which achieves maximum output with limited technical complexity and a low rate of errors.

b) Solution

The object is achieved by the features of claims 1, 2 and 16. Advantageous embodiments can be derived from the dependent claims.

The object is achieved by a method where plural skewers are supported on a holder adjacent to one another and ingredients are pronged on all skewers of the holder simultaneously in the required sequence of the ingredients on the individual skewers.

For this purpose the ingredients are individually provided in a cup which has a pass through opening in a center of its base so that the skewer coming from above can be inserted through the ingredient and through the hole. A set of bowls is provided for each individual skewer, wherein the ingredients which shall be subsequently placed on the skewer are disposed in the set of cups.

According to the number of skewers in a holder several of these sets of cups.

The skewers are received in a movable skewer holder parallel adjacent to one another with an offset and are supported in the skewer holder with their rear ends.

This facilitates lowering the skewer holder with all skewers included therein relative to respectively identical cups of the different sets of cups while pronging an ingredient onto every skewer and performing this step in sequence along all cups of all cup sets until all skewers in the skewer holder are simultaneously filled with ingredients.

Advantageously the sets of cups include rows of cups, in particular straight rows of cups. Plural such rows of cups are arranged at a distance which corresponds to a distance of the skewers in the skewer holder.

This cup arrangement including parallel rows of cups is movable transversal to an extension of the rows of cups and forms a conveyor belt for the ingredients.

An elongated skewer holder is arranged transversal over plural rows of cups for pronging, thus over as many rows of cups as there are skewers in the skewer holder.

For pronging the arrangement of cups is stopped until the entire row of cups which is associated with every skewer in the skewer holder has been worked through.

Then the skewer arrangement moves forward in its movement direction by the same number of rows of cups and the skewer holder that is provided with empty skewers recommences pronging.

In order for the skewers not to prong out laterally during pronging they are laterally supported in a front portion, at least during pronging of the ingredients.

Filling the cups of the cup arrangement is advantageously performed in an automated manner in that storage containers for the ingredients are arranged at a beginning of the cup arrangement in rows transversal to the movement direction of the cup arrangement, wherein the ingredients fall individually into the cups of the cup arrangement arranged thereunder from outlets of the storage container.

In order to assure that only one individual ingredient is arranged in a cup the cups have a recess with a respective depth which can only receive one ingredient. When a second ingredient is placed there above it is removed in different ways.

The simplest solution is a scraper advantageously configured as a scraper shaft that rotates against a running direction of the cup arrangement, wherein the scraper extends transversal to the moving direction above the cup arrangement and retains additional ingredients until they fall into an empty cup.

A more complex version includes an upward slope of the cup arrangement in movement direction and making the cup arrangement vibrate in order to have ingredients that are not nested in an indentation of a cup slide downward along the slant of the cup arrangement until they fall into an empty cup.

When required both methods can also be combined.

Feeding the skewer holder with empty skewers can also be automated.

Thus, the skewers are provided on a skewer support parallel to each other with offsets that correspond to skewer receivers in the skewer support. Additionally also rear ends of the skewers have to be freely accessible in order to be engaged by the skewer receivers of the skewer holder.

The skewers, however are received in bulk and have to be separated first.

For this purpose the skewers are poured parallel to each other into a skewer magazine with an outlet opening and are individually removed from the outlet opening and placed on a skewer conveyor with correct spacing.

This process can also be automated by an individualizer which will be described in a subsequent embodiment.

Finished shish kebab skewers are then placed by the skewer holder into packages, typically dishes. The dishes are typically arranged directly behind one another in a storage portion, for example on an extraction conveyor for the dishes and typically not with an offset that corresponds to the offset of the skewers in the skewer holder.

Therefore the skewers have to be placed in packages individually or in groups. Therefore the skewer receivers of the skewer holder can be opened and closed individually and independently from one another so that the skewer receivers can support or release the skewers individually.

The skewer holder is being moved in cycles:
initially from the skewer station for loading with new, empty skewers
from there to the cup arrangement for pronging the ingredients
from there to the storage area with the packages, in particular dishes into which the finished shish kebab skewers are placed.

The cups may have to be individualized as well since they are often delivered stacked into each other. For this, however solutions are known and available.

The machine includes various functional modules, namely at least an ingredient module and a movable skewer holder.

In the skewer holder plural skewers are received parallel to each other with a defined distance from each other at a rear end in order to be able to prong accordingly positioned ingredients simultaneously using the skewer holder and the skewers protruding therefrom.

Providing the ingredients in a predetermined arrangement is provided by the ingredient module which includes a plurality of cups in which a piece of an ingredient is respectively provided.

For pronging the skewer holder can be lowered so that the respective skewer is thrusted through the ingredient in the cup and the skewer can protrude by any amount through the pass through hole in the base of the cup.

Sets of cups with identical ingredients as contents are provided in the spatial arrangement relative to each other that corresponds to the spatial arrangement of the skewers in the skewer support. Advantageously the skewers are arranged in the skewer holder in a straight line.

Therefore the cups in the cup rows should be arranged so that a number of cups of a cup arrangement corresponds to a number of ingredients on a completed shish kebab skewer, advantageously, however, a sequence of the ingredients within the cup row of cups does not correspond to a sequence of ingredients on the subsequent shish kebab skewer in order to facilitate filling the cups.

Such cup rows of filled cups are arranged behind one another, thus with individual cup rows parallel and offset from one another in a sufficient number as a two dimensional approximately horizontal cup arrangement, so that the number of cups in extension direction of the cup arrangement, thus transversal to the extension of the cup rows is greater than the number of the skewers of the skewer holder.

The distance between the cup rows corresponds to a distance of the skewers in the skewer holder.

Thus the skewer holder with its longitudinal direction in extension of the cup arrangement can prong a first ingredient in each cup row, subsequently prong the second ingredient in the cup row until the cup rows that are currently being processed are empty and the skewers supported in the skewer holder are filled.

Then the cup arrangement moves forward in its direction of extension by the length of the skewer holder, thus by the number of the skewers supported in the skewer holder and the next cycle commences with empty skewers in the skewer holder.

In any case the machine also includes a control in order to control the movement of the movable components relative to each other.

The machine can include additional components to provide further automation.

Thus, a skewer delivery module can be provided into which the skewers are filled and individualized, checked for straightness and then arranged relative to one another with an offset that corresponds to the offset of the skewer receivers in the skewer support, wherein the rear end is freely accessible to be engaged by the skewer holder.

Furthermore a depositing group can be provided which includes a depositing surface for packages for receiving the completed shish kebab skewers and an extraction conveying device for the filled packages.

The ingredient module can additionally include a filling device for automated filling of the cups of the cup arrangement with a respectively defined ingredient.

For this purpose storage containers with a respective type of ingredient are arranged adjacent to one another in the direction of extension of the cup rows, typically with a width of plural cup lines, respectively with an outlet, e.g. configured as an open side over the cup rows which run along below in the movement direction of the cup arrangement. Following gravity the ingredients fall in to the cups, possibly more than one ingredient falls onto or into a cup.

Excess ingredients resting on the cup arrangement can be removed manually.

A more automated solution for the removal includes a cup arrangement that slopes upward from the ingredient outlets, wherein the cups are put into vibration by a vibrator. Thus the ingredients that are not arranged in a recess of a cup slide downward along the slope of the cup arrangement until they find an empty cup and fall into it.

Instead of using vibration, excessive ingredients can also be pushed into the cups by a scraper, advantageously a scraper shaft rotating against the running direction of the cup arrangement wherein plural scrapers protrude from the scraper shaft and are distributed over a circumference of the scraper shaft.

In case storing the ingredients in simple upward protruding funnel shaped storage containers does not suffice for uniform dispensing to the cup arrangement, effective individualizers that are adapted to the properties of the ingredient can be used for the respective ingredients between the storage containers and the cup arrangement. Thus pieces of meat adhere to each other much more strongly than pieces of onion or paprika.

In order for a respective ingredient to be centered in a respective cup above a hole in the base of the cup, the cups have flanks that slope upward in outward direction and cups there for example are configured rectangular.

The individual cup rows are advantageously configured in one piece in bar-shape. The advantageously bar shaped cup rows are connected with their ends between two parallel running annular endless circumferential bar conveyors which cause the movement of the cup arrangement.

The small load bearing capability of the skewers transversal to their longitudinal direction and thus a risk of excessively long skewers kinking out, for example when they hit the base of the cup adjacent to the pass through hole, for example because the skewer received too much lateral deflection from an eccentrical ingredient.

The skewer holder is typically made from a base element in which the skewer receivers for the individual skewers are arranged in a row wherein the skewers are supported in the skewer receivers at rear ends of the skewers that are typically dull.

Advantageously the skewer holder includes a support device for laterally supporting the skewers when pronging the ingredients in their center portions.

The support device is made for example from a support device for the skewers above the cup arrangement including conical vertical guides for each skewer which are supported closely above the cups and which are typically only provided in one row below the skewer support and wherein the support device is moved together with the skewer holder in a direction of the cup row and can be formed for example from two support bars that are movable relative to one another like pincers.

Alternatively the support device is made from two guide bars which are movable relative to one another like pincers wherein the guide bars are arranged along a respective side of the row of skewers in the skewer holder and laterally support the skewers approximately in a center of their length. Through respective notches in the guide bars the skewers are also supported in longitudinal direction of the skewer holder.

The skewer support can also be variable with respect to its distance from the skewer receiver.

The skewer storage module with skewer magazine and individualizer can include a test unit for the skewers. A lack of quality of the skewers that are typically made from wood which are typically not straight or which become non-straight due to high humidity in the production facilities, and which kink very easily under load due to excessive curvature for example because they do not hit the pass through hole in the cut anymore.

Furthermore, the skewers are delivered in large packets and still have to be individualized. Individualizing is performed for example by two or three circular discs that are arranged at a distance from one another and which jointly rotate about a horizontal axis, wherein aligned recesses for receiving a skewer that extends over all discs are provided in an outer circumference of the discs.

The discs rotate with their outer circumference closely adjacent to the open side of a storage container for the skewers which operates as an outlet so that a skewer drops into each set of recesses and so that the skewer is moved upward by the rotating circular discs as long as it is sufficiently straight. If the skewer is not moved along it can already be removed from the individualizer at this location using a scraper.

After surmounting the highest point of the circular disc, the skewers are placed on a skewer conveyor by the circular discs on another side, wherein the skewer conveyor moves relative to the speed of rotation of the circular discs, so that the skewers are at a distance on the skewer conveyor which corresponds to the distance of the individual skewer supports in the skewer holder.

Since the rear ends of the skewers are exposed on the skewer conveyor, the skewer holder can simultaneously grip a respective number of skewers on the skewer holder and hold them in its skewer receivers and take them off the skewer conveyor.

In addition to an individualizer, a testing unit, advantageously a touch free optical testing unit, is provided which checks straightness of the skewers and sorts out non-straight skewers at the latest on the skewer conveyor, better already on the individualizer. Also testing for sufficient length of the skewer can be integrated.

The skewer holder is advantageously attached at a robotic arm and pivotable in particular by at least 90 degrees and moveable so that the skewer holder can reach the skewer conveyor and also the cup arrangement and also the depositing area for completed skewers.

The depositing area can be part of a depositing module which includes for example a dish conveyor which can form the depositing area.

Empty packages, in particular dishes, are arranged in the depositing area for inserting the completed shish kabob skewers using the skewer holder.

In the storage area, the packages, in particular the shells, adjoin advantageously without any offset. The skewers are deposited therein by the skewer support in that the individual skewer receivers are opened individually and the skewer supported therein is deposited in a dish before the at least one next skewer receiver is opened optionally after moving the skewer holder in the direction of extension of the row of dishes.

The depositing module can also include a dish dispenser in order to individualize the dishes that are delivered in stacks and to store them on the storage area, in particular the dish conveyor.

c) Embodiments

Figure 2C:
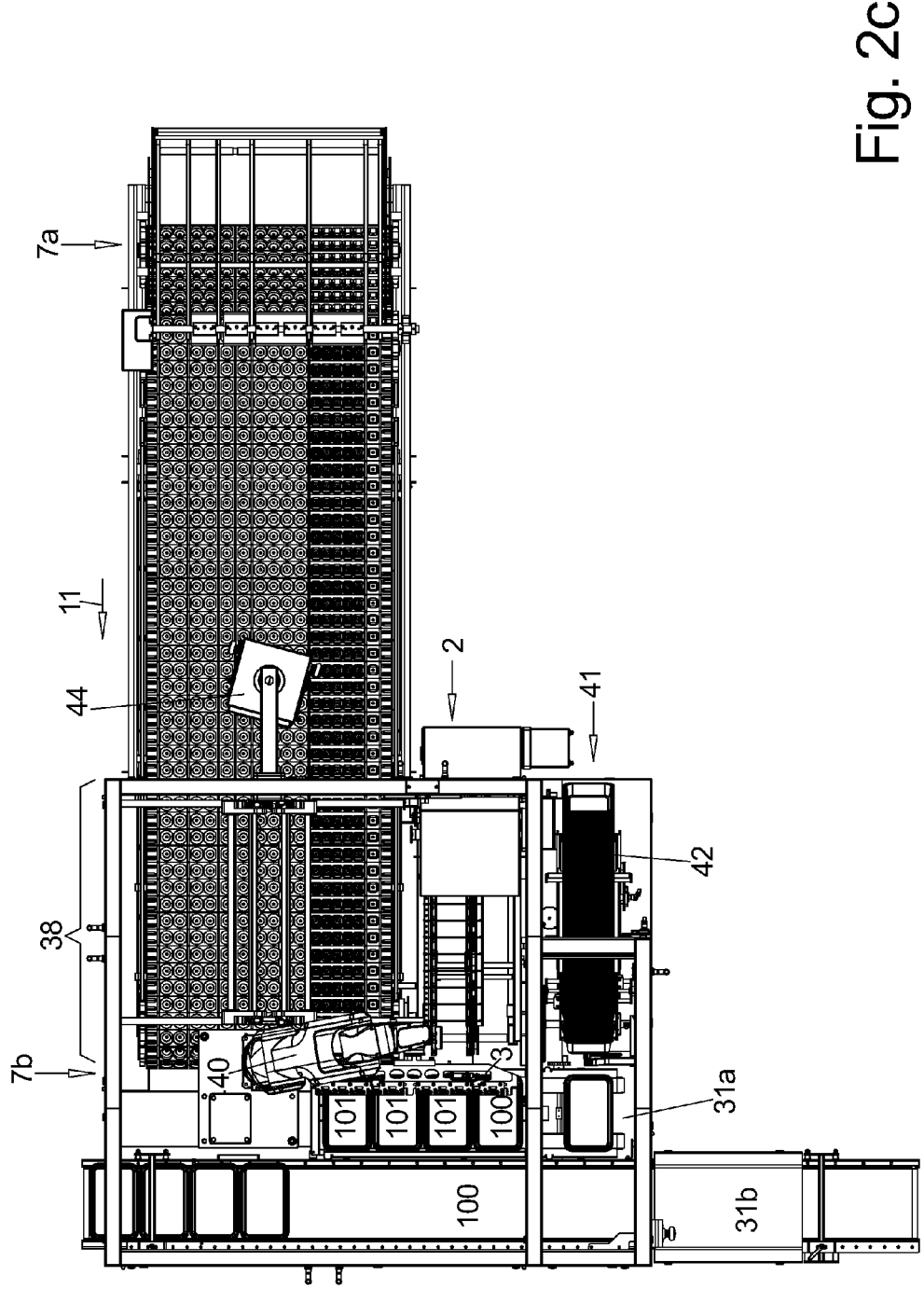
Figure 3B:
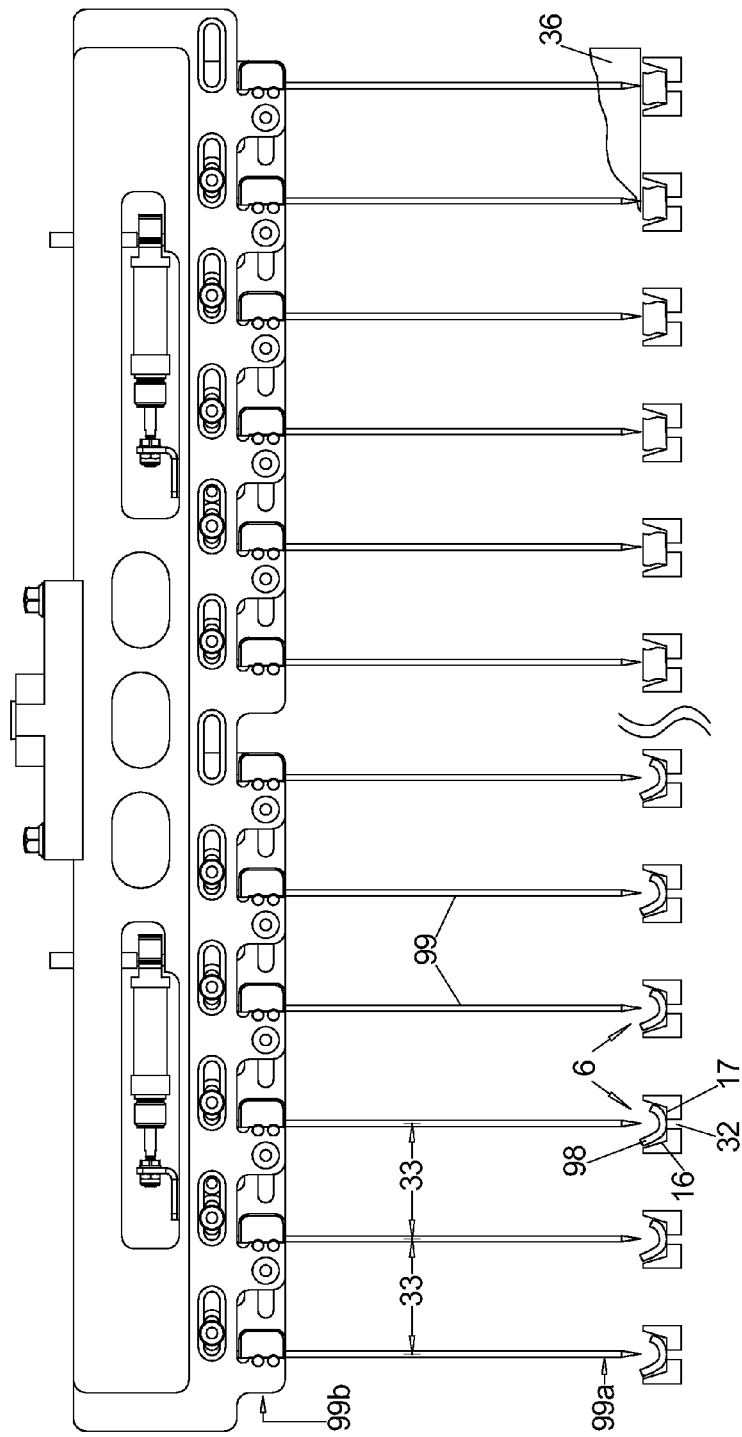
Figure 3C:
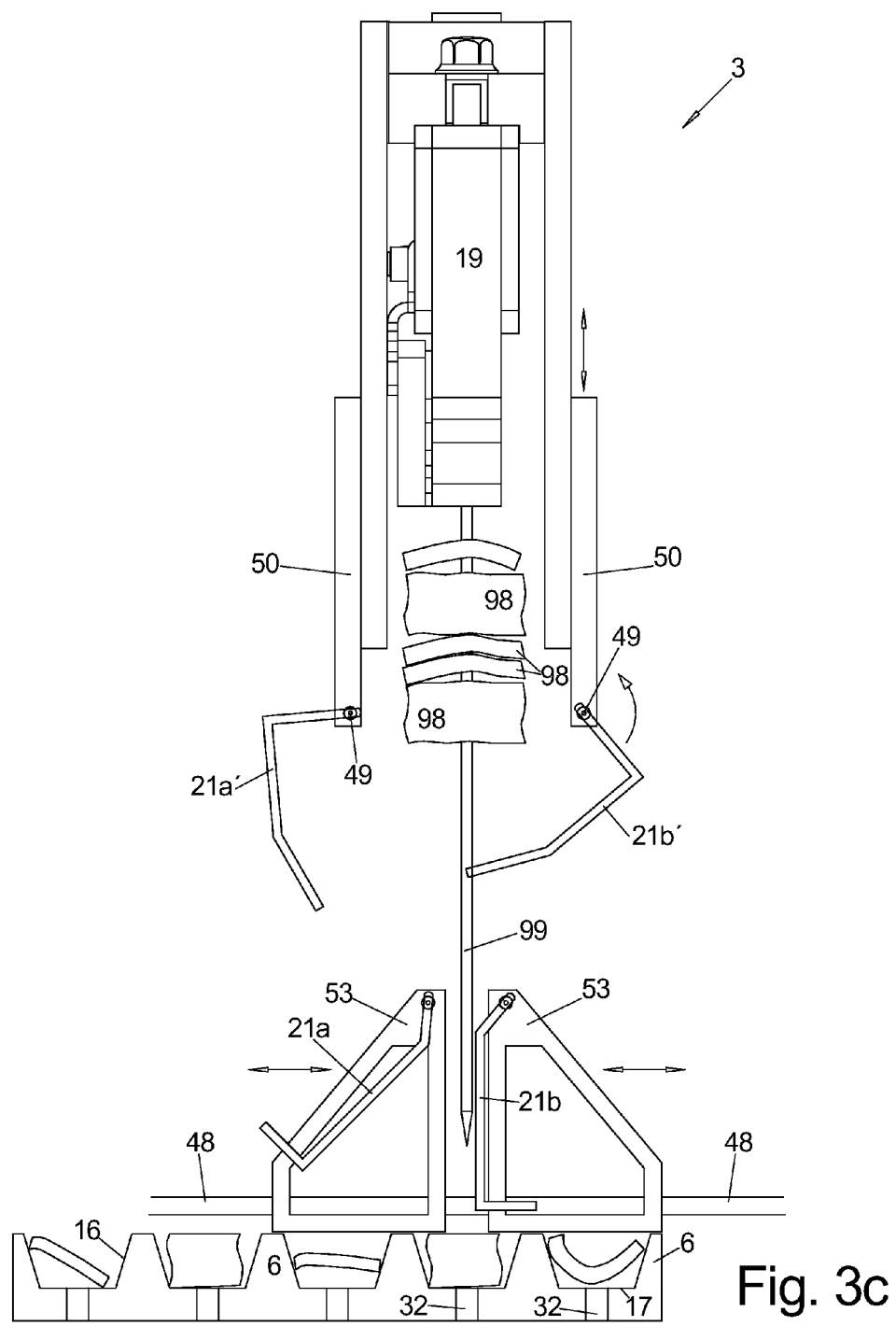
Figure 4B:
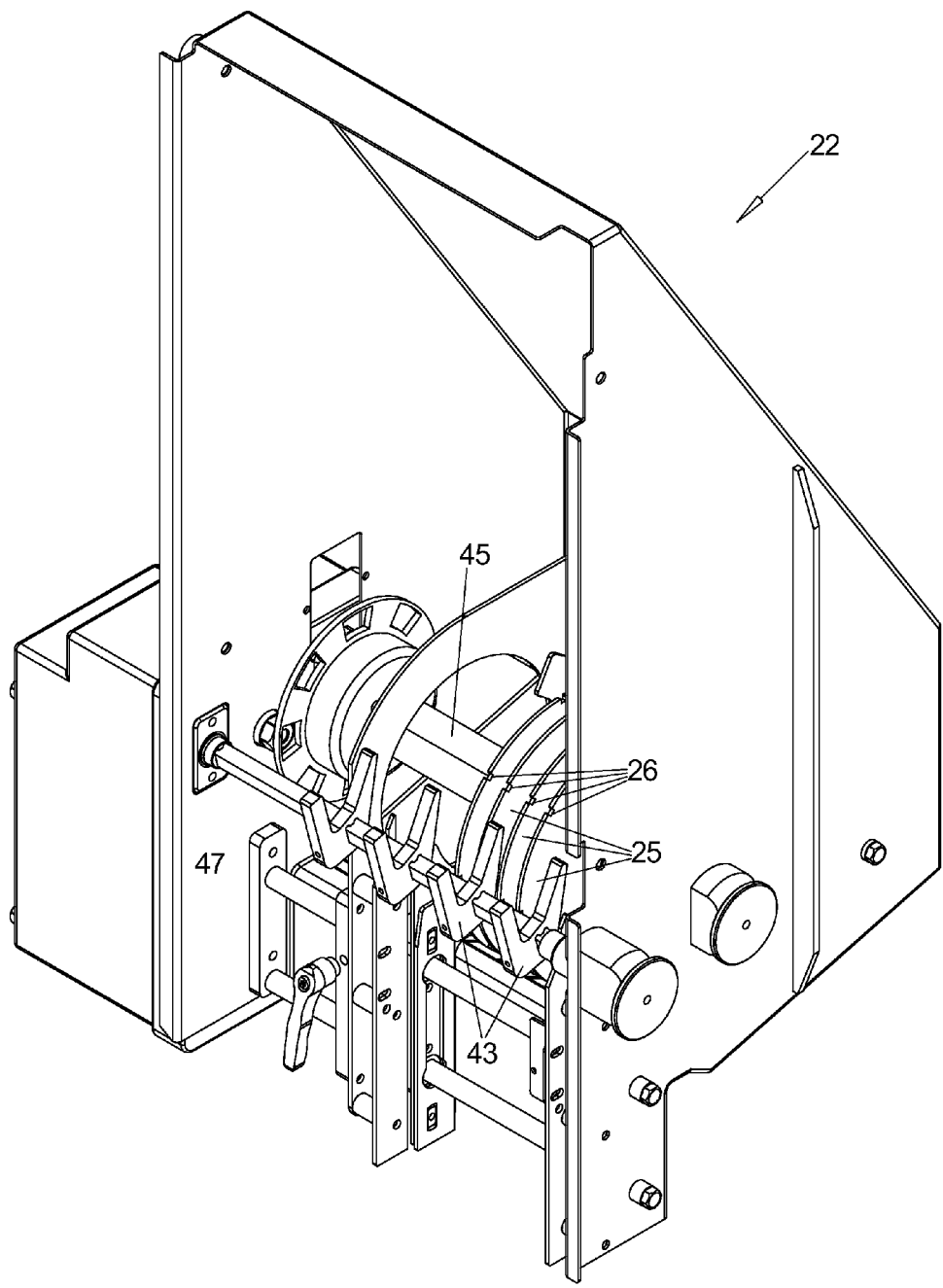
Figure 4C:
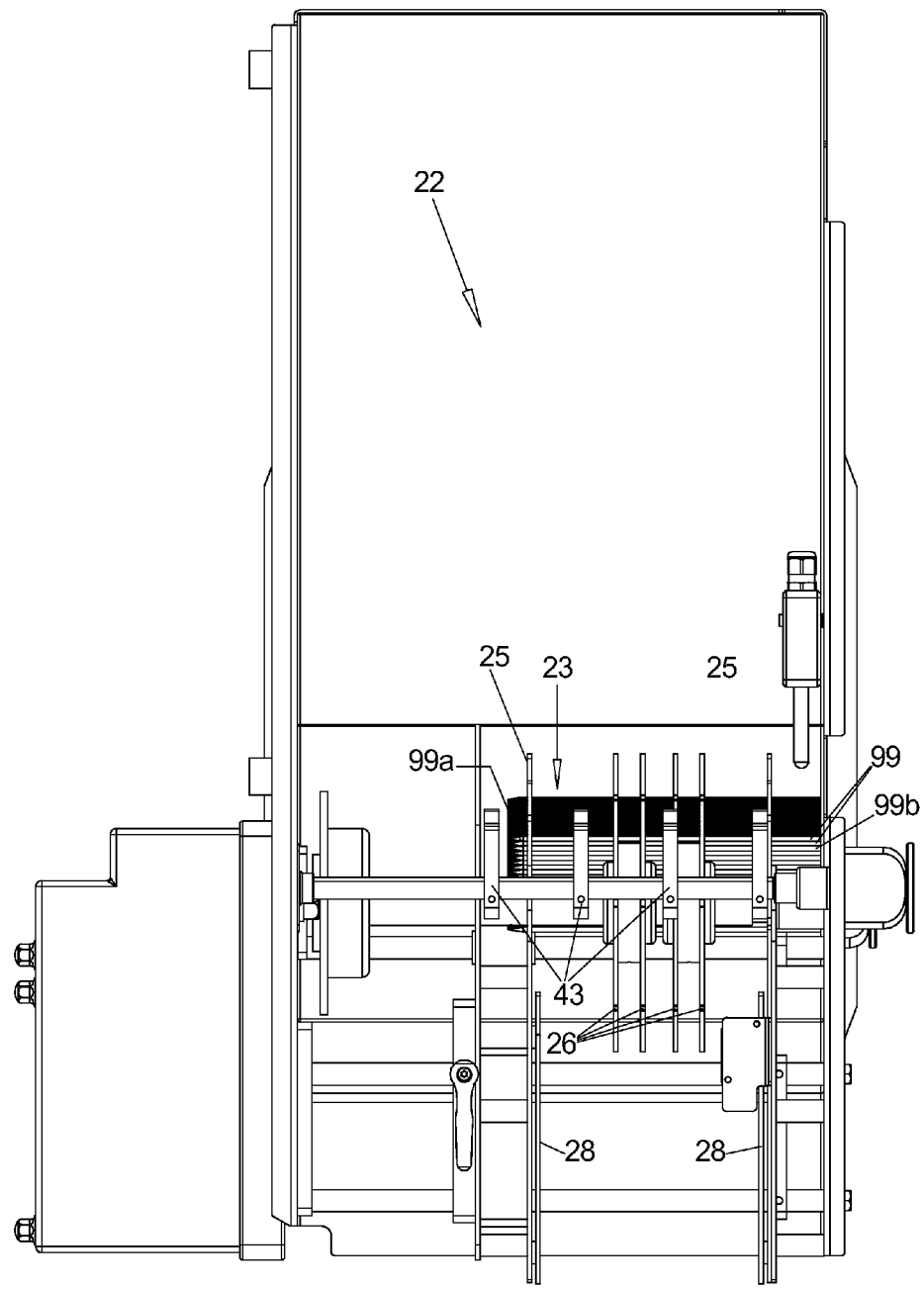
Figure 5:
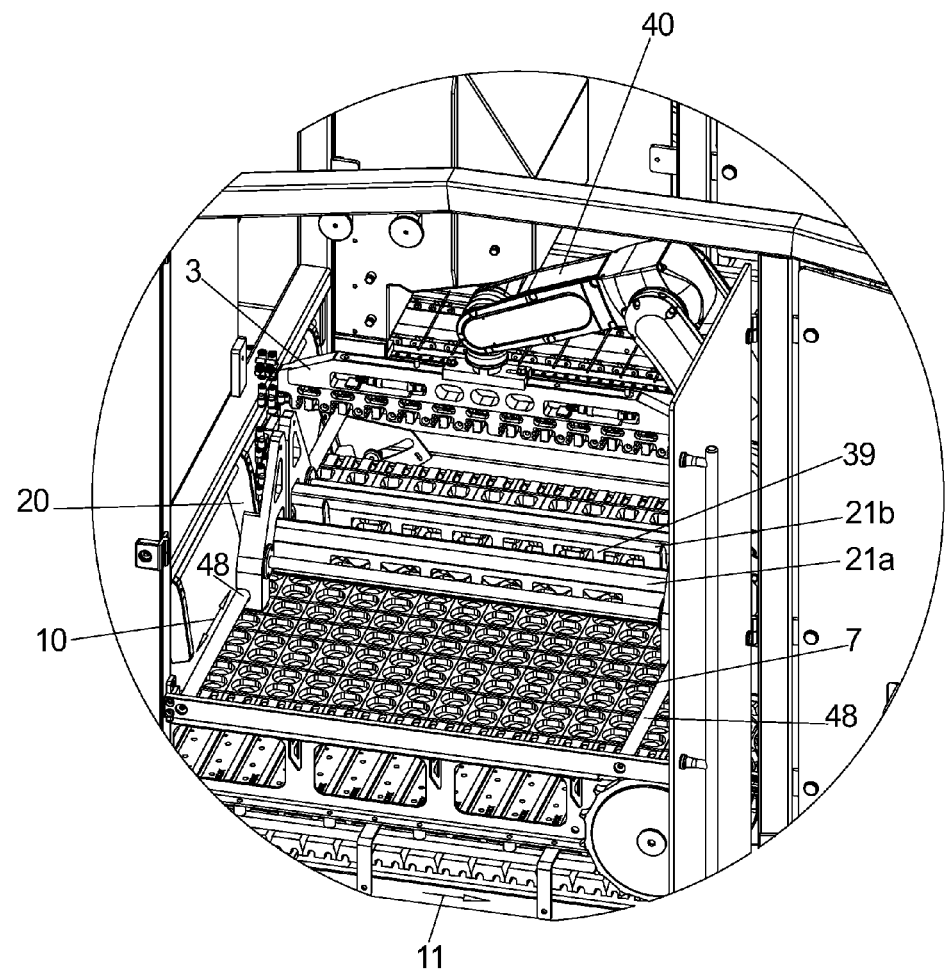

Embodiments of the invention are subsequently described in more detail with reference to drawing figures, wherein:

FIG. 1a-e: illustrates the shish kabob machine in various views,

FIG. 2a-c: illustrates the shish kabob machine in different operating conditions from above, FIG. 3a-c: illustrates the skewer holder, FIG. 4a-c: illustrates the individualizer for the skewers; and FIG. 5: illustrates the support device for the skewers during pronging.

Figure 1B:
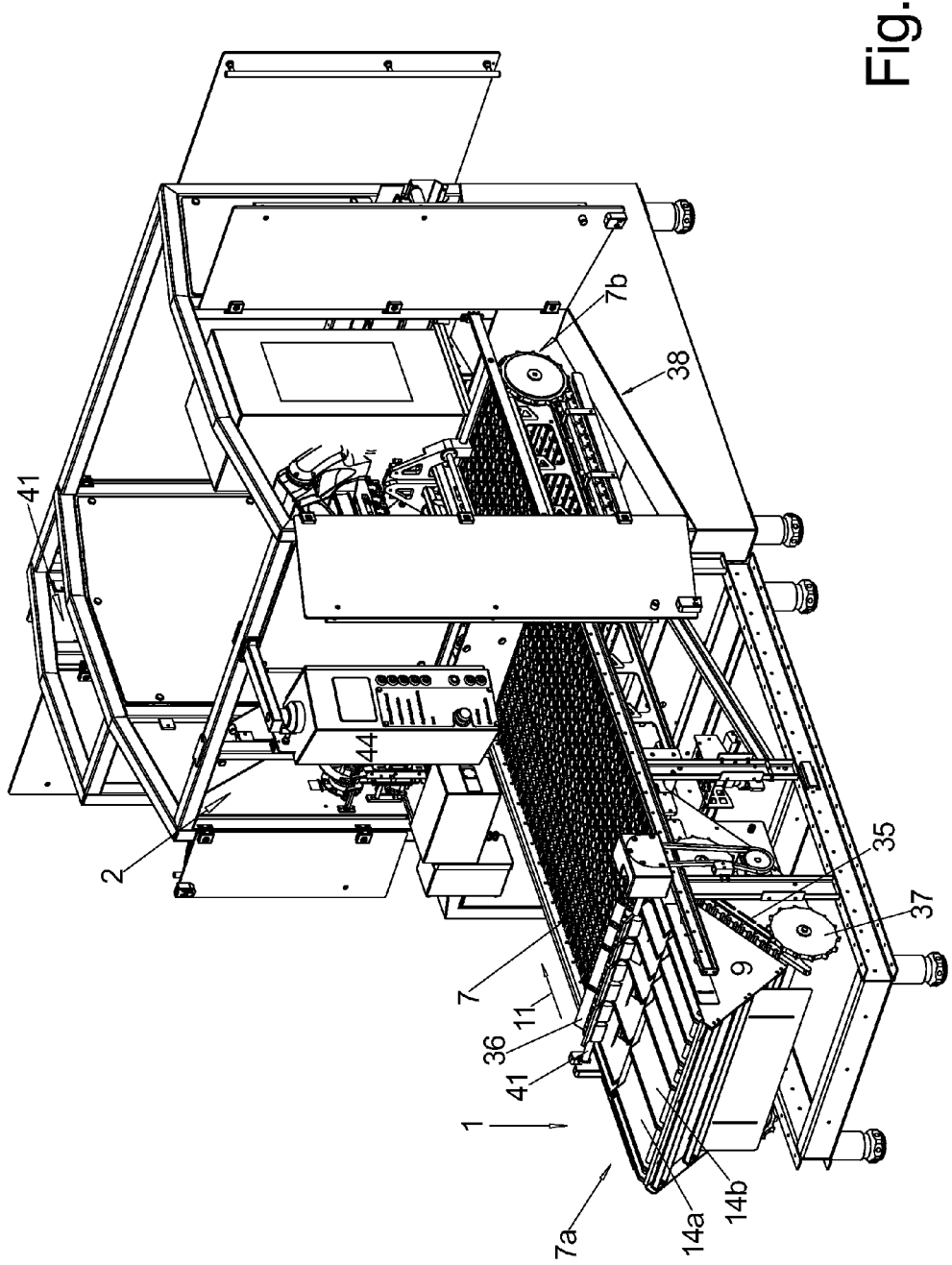
Figure 1D:
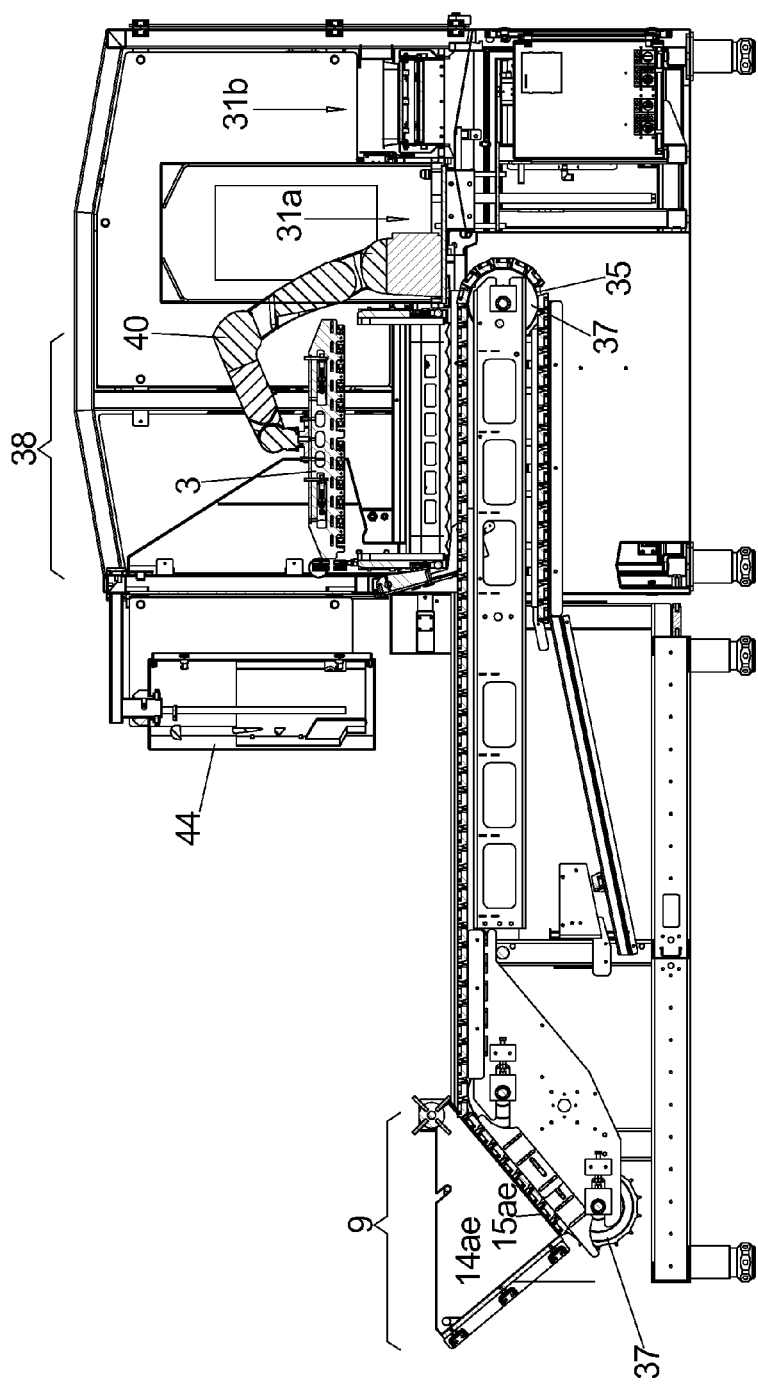

In FIG. 1, FIGS. 1a-c illustrate the shish kabob machine in a prospective view, thus in FIG. 1a with laterally closed housing elements and in FIGS. 1b, c in different prospective views with open housing elements FIG. 1d illustrates a vertical longitudinal view through the machine in the condition of FIG. 2b and FIG. 1e illustrates a view of the machine in longitudinal direction from the front end.

As apparent from FIG. 1 and also FIG. 2, one of the essential components of the machine is a cup arrangement 7 configured as an endless revolving band including individual cups 6.

The cup arrangement 7 moves in a controlled manner in its running direction, the longitudinal direction of the machine. In the present application, also designated as "second direction" from a left front end 7a of the cup arrangement 7 to the rear end 7b wherein the front end is arranged on a left side in FIGS. 1 and 2.

As evident from FIG. 3b, the cup arrangement 7 is made from a plurality of cups 6 which include downward tapering recesses, thus beveled flanks 16 and a pass through borehole 32 in the base 17 which is barely large enough to let a skewer 99 penetrate.

In an enlarged view in FIG. 2a, the cups 6 are arranged parallel to one another in cup rows a, b arranged with a defined offset wherein the cup rows extend in a transversal direction 10 relative to the running direction 11 of the cup arrangement 7 and are configured as cup bars 34 whose ends are attached at a bar feeder 35 best evident in FIG. 1*d* wherein the cup feeder feeds the cup bars 34 and thus the entire cup arrangement 7 in feed direction 11. The bar feeder 35 runs over two deflection rollers 37 in an endless manner wherein at least one of the deflection rollers is driven.

Corresponding cups 6 of the adjacent cup rows 8*a, b* thus form cup lines 12*a, b* extending in running direction 11 of the cup arrangement 7.

At the beginning of the cup arrangement 7, the left end in FIG. 1, there is a filling device 9 for the cup 6 which causes exactly one of the ingredients 98 to rest in the indentation of each cup 6, wherein the ingredients are to be pronged on the skewer 99.

As illustrated in FIG. 1*d*, the upper main element of the endless revolving cup arrangement 7 slopes upward at a beginning 7*a* of the cup arrangement. Through this upward sloping portion of the cup arrangement 7, the filling device 9 including plural storage containers 14*a, b* arranged adjacent to one another in transversal direction 10 is arranged, (c.f. FIG. 1*a-c*) wherein the storage containers sometimes extend over plural cup rows 12*a, b* in transversal direction and wherein the storage containers have an open side towards the cup arrangement that is arranged directly above the cup arrangement 7 and wherein the open sides act as outlets 15*a, b*.

Each storage container 14*a, b* respectively includes a predetermined ingredient 98. Typically a shish kebab skewer 100 only includes 3 or 4 different ingredients, namely pieces of onions, pieces of paprika and pieces of meat of one or two different types of meat.

However, more than these three or four storage containers 14*a, b* can be provided so that there are storage containers which include the same ingredient 98 which helps optimizing the movement path of the skewer holder 3 during subsequent pronging.

Since the ingredients 98 only drop into the cup 6, it can happen that more than one ingredient 98 comes to rest in or on a cup 6 which is to be avoided. For this purpose, a scraper shaft 41 is arranged at an end of the filling device 9 from which scraper device plural scrapers 36 that are advantageously elastic extend distributed over the circumference and wherein the scraper shaft rotates so that the scrapers 36 scrape over the cup arrangement 7 against a running direction. the scrapers 36 extend over the entire width 10 of the cup arrangement 7 and their scraper edges protrude downward directly above the top side of the cup arrangement 7 which has the effect when plural ingredients 98 sitting on top of one another in a cup 6, a second or a third ingredient 98 that are arranged higher up is pushed back and falls into a subsequent empty cup 6.

The cup arrangement 7 filled with a respective ingredient 98 in each cup 6 then runs into the pronging portion 38 in which for example at an end 7*b* of the cup arrangement 7 (c.f. FIG. 1*d*) a robot arm 40 or a suitable other handling device for the cup holder 3 is approximately arranged in a center of the transversal extension of the cup arrangement 7, wherein a skewer holder 3 is attached at a free end of the robotic arm, wherein the skewer holders 3 do not yet include skewers 99 in FIG. 1.

In FIG. 3*a*, a skewer holder of this type is illustrated by itself in a perspective view, in FIG. 3*b* in a front view and in FIG. 3*c* in the side view, respectively loaded with skewers 99.

The skewer holder 3 includes a bar shaped base element 19, at whose top side there is the coupling device for attachment at the robot arm 40.

At a bottom side of the base element 19, there are individual skewer receivers 13*a, b, c* that are exactly offset in the extension of the base element 19, wherein the skewer receivers can receive and fixate a respective rear end 99*b* of a skewer 99 so that the skewers 99 supported in the individual skewer receivers 13*a, b, c* protrude from the skewer holder 3 parallel to one another and their forward pointed ends 99*a* are respectively arranged on a straight line.

The skewer holder 3 is controllable by the robotic arm 40 so that the individual skewer receivers 14*a, b, c* can be opened and closed separately and independently from each other.

As apparent from FIG. 3*b*, the skewer receivers 13*a, b, c* are offset from one another so that the skewers 99 supported therein are at identical distances 33 from one another, wherein the cups 6 are arranged in cup rows 8*a, b* that have the same distance from each other as illustrated in FIG. 2*a*.

Furthermore, there is the skewer storage module 2 adjacent to the end portion of the cup arrangement 7, wherein the skewer storage module is used for offering new empty skewers to the robot arm 40 with the skewer holder 3 for receiving.

Behind a rear end 7*b* of the cup arrangement 7, there is the depositing module 4 in which completely filled shish kebab skewers 100 are placed in dishes 101 in a depositing area 29 by the skewer holder 3 (c.f. FIG. 2*c*). Thus typically plural dishes 101 are arranged adjacent to one another in the storage area 29, advantageously at least over an extension which corresponds to an extension of the skewer holder 3 and they are arranged in transversal direction 10 of the skewer arrangement 7 slightly offset relative to its width, typically on a first dish conveyor 31*a*.

Dishes 101 filled with shish kebab skewers 100 can then be moved in extension 11 of the cup arrangement 7, advantageously by the empty skewer holder 3 onto a dish conveyor 31*b* extending there behind in transversal direction 11 wherein the dish conveyor extracts the filled dishes 101 for further packaging.

Advantageously also the deposition area is configured as a dish conveyor 31*a* since the dishes 101 are initially individualized by a dish individualizer 41 which is not described in more detail since solutions are available in the art, wherein the individualizing is done from a stack 42 of dishes 101 stacked into one another and placed onto the beginning of the dish conveyor 31*a* which transports the individualized dishes 101 into the storage portion for the shish kebab skewers 100.

In this sense, FIGS. 2*a, b, c* illustrate the different functional conditions of the robotic arm 40 and thus of the skewer holder 3.

The robotic arm 40 can pivot the skewer holder 3 about a vertical axis and also about at least one, advantageously two horizontal axes that are perpendicular to each other and can thus manipulate the skewer holder 3 into any desired position in space.

FIG. 2*a* illustrates the skewer holder 3 in a horizontal position with its longitudinal direction in running direction of a skewer conveyor 28 arranged adjacent to the cup arrangement 7, wherein the skewers 99 are deposited on the skewer conveyor in distances 33 corresponding to the skewer receivers 13*a, b* of the skewer holder 3 parallel and adjacent to one another so that they extend transversally over the skewer conveyor 28 and so that they protrude with their rear free ends 99*b* over the skewer conveyor 28.

Thus, the skewer holder can receive a respective number of skewers 99, advantageously when the skewer conveyor 28 is stopped, wherein the skewer holder 3 with open skewer receivers 13a, b, c approaches rear ends 99b of the skewers 99 that are adjacent to one another so that the skewers protrude into the skewer receivers 13a, b, c up to a stop that is provided at this location and then all skewer receivers 13a, b, c are closed together, thus the skewer holder 3 is loaded with new empty skewers 99.

It is subsequently described with reference to FIGS. 4a-c how the skewers 99 are individualized and deposited on the skewer conveyor 28.

Thereafter the robot aligns the skewer holder with its extension in running direction 11 of the cup arrangement 7 for pronging (c.f. FIG. 2b) and lowers the skewer holder in the pronging portion 38 respectively from above into a dish set 39 which extends over a number of skewers 99 that are supported in a number of skewer rows 8a, b in the skewer holder 3 and receives the next required ingredient 98.

This way, the skewer holder 3 moves over a width of the cup arrangement 7 in the pronging portion 38, wherein the number of cups 6 in a row of skewers 8 corresponds to the number of ingredients 98 that are to be received on a shish kebab skewer 100 but the number of cups does not necessarily correspond to the sequence in transversal direction of the cup arrangement 7 in order to minimize the number of storage containers.

When the skewers 99 in the skewer holder 3 are completely filled with ingredients 98 in this manner so that they form completely loaded shish kebab skewers 100, the robot arm 40 pivots the skewer holder 3 (c.f. FIG. 2c) to the storage portion 29 with its extension parallel to the running direction of the dish conveyor 31a, so that the shish kebab skewers 100 are supported above the dishes 101. Then the skewer receivers 13a, b are opened either jointly or individually separately, optionally while moving the skewer holder in extension direction of the dish conveyor 31a until a desired number of shish kebab skewers 100 is arranged in each dish 101.

Shish kebab skewers 100 of plural skewer holder 3 may be required until all dishes 101 in the depositing area 29 are filled completely.

When the dishes 101 are completely filled, the filled dishes 101 can either be moved by the empty skewer holder 3 or by a separate slide 101 onto an additional dish conveyor 31b running parallel thereto further behind, wherein the additional dish conveyor is used as an extraction conveyor for the filled dishes 101 for further processing.

FIGS. 4a-c illustrate individualizing of the skewers which are stored as bulk material in a skewer magazine 23.

The function is evident from FIG. 4a.

The individualizer 22 essentially includes plural circular discs 25 that are arranged axially offset on a disc axis 45 in whose outer circumference axially aligned recesses 26 are arranged distributed over the circumference at defined positions so that a cross-section of a skewer 99 can respectively be received therein at least partially.

Thus one respective skewer can drop into the aligned recesses 26 of the plural discs 25.

The disc axis 45 extends essentially horizontal and thus the circular discs 25 are respectively arranged in a vertical plane.

The skewer magazine 23 is arranged on one side viewed in a direction of the disc axis 45 of the disc unit made from plural discs 25, wherein the skewers 99 are loosely stacked parallel to one another and with respectively aligned front and rear ends.

The magazine is open on one side so that the skewers 99 contact circumferences of the circular discs 25 at a level of their disc axes 45 or slightly above. Rotating all discs 25 together and synchronously about the disc axis 25, clockwise in FIG. 4a, thus so that the circumference of the circular discs 25 moves up from below along the loosely stacked skewers 99, one skewer 99 slides into one respective recess 26 of the circular discs 25, wherein the recesses 26 are in alignment with one another and is carried upward along the circumference of the circular discs 25.

Above a highest point of the circular discs 25, a test unit 24 is arranged which optically measures straightness of a skewer 99 arranged at this location.

When rotating the circular discs 25 further, the respective skewer 99 moves downward along the circumference of the circular discs 25 and would fall out of the aligned recesses 26 starting at a particular point in time. In order to be able to move the skewers further downward beyond this circumferential point, a respective plate shaped opposite guide 52 is respectively arranged outside the circular discs 25 at a distance so that the skewer 99 arranged there between in a recess 26 can be moved further downward in a defined manner.

The skewers 99 however should be deposited on a horizontal skewer conveyor 28 that is arranged on an opposite side relative to the skewer magazine with respect to the disc axis 45 at a defined distance 33, the distance of the skewer receivers 13a, b in the skewer holder 3.

For this purpose, grooves 46 can be provided in the skewer conveyor 28 that is provided as an endless conveyor over two deflection rollers wherein the grooves extend at the distance 33 transversal over the skewer conveyor 28 and are advantageously configured self-centering wherein a respective skewer 99 falls into the grooves, wherein a skewer 99 that respective also extends transversally to the skewer conveyor 28 also falls into the grooves.

This is facilitated in that the skewers 99 are transported further downward between the circular discs 25 and the opposite guides 52 up to the open end of an approximately vertically arranged slot shaped skewer buffer 51 arranged there below, wherein the slot shaped skewer buffer is so tight that the skewers can only be stacked therein on top of each other. The skewers 99 fall into the skewer buffer 51 and fill the skewer buffer up to a predetermined level of a filling level sensor, then the individualizer stops.

Slightly below a lower open outlet end of the skewer buffer 51, the skewer conveyor 28 runs through, wherein the distance there between is so small so that only a skewer falling into one of the grooves 46 is moved along by the skewer conveyor 28.

In order to sort out curved skewers, U-shaped extractors 43 are arranged on a dispensing side of the circular discs 21, thus above the skewer conveyor 28 on a pivot shaft 27 which extends parallel to the disc axis 45 slightly outside the circumferential portion of the circular disc 25 axially offset on the pivot shaft 47 between the circular discs 25. The U-shaped extractors can be pivoted into a circumferential portion of the circular discs 25 synchronously by pivoting the pivot shaft 47 with the free end of its arm oriented towards the circular discs 25 so that the next skewer that moves downward driven by the circular discs 25 and determined to be curved by the testing unit 24 falls into the U-shaped recesses of the aligned extractors 43 so that the skewer can be disposed of later on.

Advantageously, the skewer conveyor 28 is only made from narrow endless circumferential bands, belts, chains or similar that are offset in extension of the skewer, wherein one of the bands, belts or chain is proximal to a front end 99a of the skewers 99 and the other is offset backward from the rear aligned ends 99b of the skewers 99 so that the overhang of the rear end 99b of the skewers 99 that rest on the skewer conveyor 28 suffices relative to the skewer conveyor 28 for engaging the rear ends with the skewer receivers 13a, b, c of the skewer holder 3 as described supra.

The skewers 99 which are typically made from wood and which are typically thin can easily kink out sideways and fracture.

In order to prevent kinking and fracturing of the skewers 99 during pronging, a support device 20 is being used.

FIG. 5 illustrates a detail of the pronging portion 38 of the cup arrangement 7 according to FIG. 2b and the bottom of FIG. 3c illustrates a first embodiment of the support device 20.

The robotic arm 40 supports the bar shaped skewer holder 3 which is illustrated without inserted skewers 99 for reasons of clarity. Above a cup set 39 provided for pronging that is arranged parallel to the running direction 11 of the cup arrangement 7 wherein the cup set is advantageously stopped for pronging the ingredients 98 from the cup 6 of the cup arrangement 7, otherwise the robotic arm 40 would have to be moved synchronously with the cup arrangement 7.

Slightly above the cup set 39 provided for pronging, a respective support bar 21a, b is arranged parallel to the cup set 39 on both sides, wherein the support bars can be individually moved in a controlled manner along guides 48 transversally extending over the cup arrangement 7, wherein the movement is performed by support blocks 53 in which the guides 48 are attached with their ends, in particular pivotably supported and can be moved from both sides above and towards the pass through boreholes 32 in this cup set 39 so that the skewers 99 which are received in the skewer holder 3 and not illustrated herein can just be run through in between.

Optionally vertically extending grooves can be arranged at surfaces of the support bars 21a, b that are oriented towards each other, so that vertical pass through openings are created when the support bars 21a, b are moved in contact with each other, wherein the skewers 99 can just be run through the pass through openings when the skewer holder 3 is lowered. These pass through openings then have to be in alignment with the pass through openings 32 in the bases 17 of the cup set 39. The pass through openings 32 can be conically expanded for inserting the skewers at its upper end.

The bearing blocks 53 that are movable transversally over the cup arrangement along guides 48 can be used to move the support bars 21a, b with the skewer holder 3 from one cup set 39 to another. The support position of the support bars 21a, b is advantageously reached in that the support bar can be pivoted about a longitudinally oriented pivot axis relative to the support blocks 53 towards the skewer row in the skewer holder 3. For complete lowering and raising of the skewers 99 they are pivoted into an idle position away from the skewer row in which they cannot collide with the already pronged ingredients 98 on the partially loaded skewer 99.

Alternatively the support bars 21a, b can be fixated at the bearing blocks 53 so they are not pivotable and can only be moved between support position and idle position by a linear movement of the bearing blocks 53.

This way the skewers are laterally supported and the support device 20 moves together with the skewer holder during pronging from one cup set provided for pronging to the next in transversal direction 10 over the cup arrangement 7 which advantageously stands still.

A support device 20 for the skewers can also be arranged at the skewer support 3 itself instead of being arranged at the machine frame above the skewer arrangement 7 as illustrated in an alternative embodiment in FIG. 3c. This however increases the weight of the skewer holder 3.

Thus, two prong shaped support bars 21'a, b extending parallel to the row of skewers 99 are pivotable about a pivot axis 49 which also extends parallel to the longitudinal extension of the row of skewers 99 of the skewer holder 3 and thus parallel to the base element 19 of the skewer holder 3 so that the two support bars 21'a, b in a condition pivoted towards the row of skewers 99 laterally support the skewers, advantageously in that recesses for receiving the skewer cross-sections are provided in a front edge of the support bar 21'a, b oriented towards the skewers 99.

The pivot axis 49 is thus attached at a lower end of a support element 50 which is attached along the base element 19 of the skewer holder in extension direction of the skewers 99 and movable in a controlled manner as a function of the extent of being filled with skewers 99.

A control which is advantageously movably attached at a free arm of the operator console 44 controls individual movements of the machine relative to each other with respect to time and space.

REFERENCE NUMERALS AND DESIGNATIONS 1 ingredient module
2 skewer module
3 skewer holder
4 depositing module
5 control
6 cup
7 cup arrangement
7a beginning
7b end
8a, b cup row
9 filling device
10 first direction, transversal direction cup arrangement
11 second direction, running direction cup arrangement
12a, b cup line
13a, b skewer receiver
14a, b storage container
15a, b outlet
16 flank
17 base
18 cup conveyor
19 base element
20 support device
21a, b support bar
22 individualizer
23 skewer magazine
24 test unit
25 circular disc
26 recess
27 axis
28 skewer conveyor
29 depositing area
30 dish dispenser
31a, b dish conveyor
32 pass through opening
33 distance
34 cup bar
35 bar conveyor
36 scraper
37 deflection roller
38 pronging portion
39 cup set 40 robotic arm
41 scraper shaft
42 stack
43 receiver
44 operating console
45 disc axis
46 groove
47 pivot shaft
48 guide
49 pivot axes
50 support element
51 skewer buffer
52 opposite guide
53 bearing block
98 ingredient
99 skewer
99a front end
99b rear end
100 shish kebab skewer
101 packaging, dish

The invention claimed is:

1. A shish kebab machine for producing shish kebab skewers (100) with a defined number and sequence of ingredients (98) on a skewer (99), the machine comprising:
an ingredient module (1) in which
a respective piece of an ingredient (98) is provided in a cup (6) with a pass through opening (32) in a base of the cup,
a plurality of said cups (6) are arranged in cup lines (12a, b)
a skewer holder (3) in which plural skewers (99) can be received parallel to one another with a defined distance (33) from one another by a skewer providing module (2),
the skewer holder (3) facilitates pronging the plural skewers (99) through accordingly spaced identical ingredients (98) of a cup line (12a, b) in the respective cups (6) of adjacent cup rows (8a, b) extending transverse to the cup lines (12a, b), and
a control (5) which controls movements of the movable components relative to each other,
wherein
the ingredient module (1)
includes an approximately horizontally arranged single component or multi-component endless or finite cup arrangement (7) made from cup rows (8a, b) arranged parallel to one another and extending in a first direction (10) and cup lines (12a, b) arranged perpendicular thereto, wherein each cup row (8a, b) includes a number of cups (6) according to the desired number of ingredients (98) on the finished shish kebab skewer (100),
the cup rows (8a, b) are arranged at a defined distance from one another,
the cup arrangement (7) is movable in a direction of a sequence of the cup rows (8a, b) in a second horizontal direction (11), and
for pronging the skewer holder (3) can be lowered so that the respective skewer (99) is thrust through the ingredient (98) in the cup (6) and the skewer (99) can protrude by any amount through the pass through opening (32) in the base of the cup; and
each said cup (6) has an opening opposite the pass through opening (32) along said direction perpendicular to the first and second direction (10, 11) wherein the ingredient module
includes a filling device (90 in movement direction (11) of the cup arrangement (7) at its beginning for filling the cups (6) from the storage containers (14a, b) arrangement adjacent to one another in a first direction (10), thus in extension direction of the cup rows (8a, b), wherein the ingredients always fall from one respective outlet (15a, b) of the storage containers exactly into a respective cup (6) in the one or plural cup rows (8a, b), and
the cup arrangement (7) slopes upward from the outlets (15a, b) and includes a vibrator which makes the cup (6) of the cup arrangement (7) vibrate, or a scraper (36) which moves excess ingredients (98) forward to an empty cup (6).

2. The shish kebab according to claim 1,
wherein the elongated skewer holder (3)
includes skewer receivers (13) that are arranged at defined distances (33) in an extension of the skewer receiver wherein skewers (99) are supportable in the skewer receivers at rear ends (99b) in a parallel position relative to each other,
wherein the skewer holder (3) can be positioned with its extension transversal over plural cup rows (8a, b) with one respective skewer (99) over a cup (6) and can pierce the skewers (99) supported in the skewer holder through the ingredients (98) in the cups (6) by lowering the skewers holder,
and wherein the elongated skewer holder (3) can deposit the finished shish kebab skewers (100).

3. The shish kebab machine according to claim 1, wherein the cups (6) have circular recesses with flanks (16) that slope outward upward.

4. The shish kebab machine according to claim 1, wherein the individual cup rows (8a, b) are integrally configured in one piece and are attached with their ends in a cup conveyor (18) which moves the cup rows (8a, b) in the second direction (11).

5. The shish kebab machine according to claim 1, wherein the skewer holder (3) is pivotable about a vertical axis by at least 90 degrees.

6. The shish kebab machine according to claim 1, wherein the skewer holder (3) includes skewer receivers (13) which can be opened and closed individually.

7. The shish kebab machine according to claim 1, wherein the skewer holder (3) includes a base element (19) with the skewer receivers (13) and a support device (20) for the skewers (99) that is movable relative to the base element (19) along the extension of the skewers, wherein the support device (20) includes two support bars (21'a, b) which are movable like pincers relative to one another wherein the support bars are respectively arranged along a side of the row of skewers (99).

8. The shish kebab machine according to claim 1, wherein a support device (20) that is movable along guides (48) in a transverse direction of the cup arrangement (7) is arranged at a bed of the shish kebab machine, wherein the support device includes support bars (21'a, b) which can be laterally applied to the row of skewers (99) of the skewer holder (3).

9. The shish kebab machine according to claim 1, wherein the cups (6) with respect to their sequence in the cup rows (8a, b) do not have the corresponding ingredient (98) in the desired sequence of the ingredients (98) on the subsequent shish kebab skewer (100) but identical ingredients (98) are arranged in adjacent cup lines (12a, b).

10. The shish kebab machine according to claim 1, wherein the skewer module (2) includes:
- a skewer magazine (23)
- an individualizer (22), and
- a test unit (24).

11. The shish kebab machine according to claim 10, wherein
the individualizer (22) includes at least two circular discs (25a, b, c) that are offset from one another and circumferentially extend about a common horizontal axis (27) and which include recesses (26) at aligned circumferential locations, wherein a skewer (99) is insertable into the recesses, wherein an outlet of the skewer magazine (23) is arranged above the axis (27) of the circular discs (25a, b, c) proximal to their outer circumference on a side of the circular discs (25a, b, c) where the recesses (26) move in upward direction, and
a skewer conveyor (28) is arranged on an opposite depositing side for depositing the skewers (99), wherein the skewer conveyor runs radially away from the circular discs (25a, b, c) of the individualizer (22).

12. The shish kebab machine according to claim 11, wherein
the test unit (24) is a touch-free optical test unit which tests the skewers (99) at least with respect to straightness, and with respect to a length and the test unit (24) is either arranged in the portion of the circular discs (25a, b, c) or in the portion of the skewer conveyor (28).

13. The shish kebab machine according to claim 1 further comprising
a depositing module (4) with a depositing area (29) for arranging dishes (101) adjacent to one another for receiving the shish kebab skewers (100) and the depositing area (29) is configured in the form of at least one dish conveyor (31a, b).

14. The shish kebab machine according to claim 13, wherein
the depositing module (4) includes a dish dispenser (30) for individualizing the dishes (101) that are provided stacked and for depositing them in the depositing area (29), on the dish conveyor (31a).

* * * * *